June 26, 1945. R. ANSCHÜTZ 2,378,902
TYPEWRITING CALCULATING MACHINE
Filed April 30, 1941  10 Sheets-Sheet 1

Inventor:
Robert Anschütz
By: Glascock Downing Seebold
 & Hys

June 26, 1945. R. ANSCHÜTZ 2,378,902
TYPEWRITING CALCULATING MACHINE
Filed April 30, 1941 10 Sheets-Sheet 3

Inventor:
Robert Anschütz

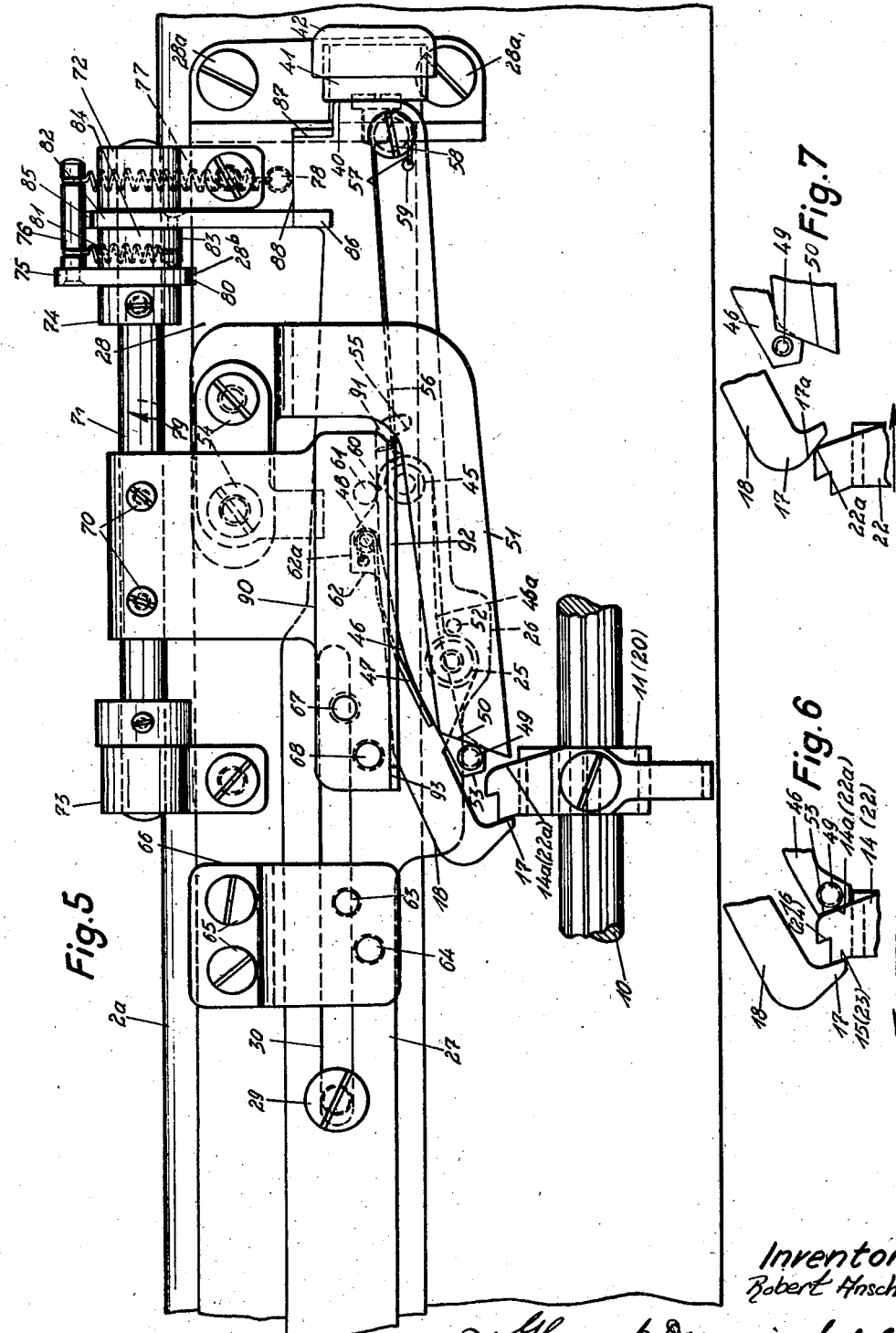

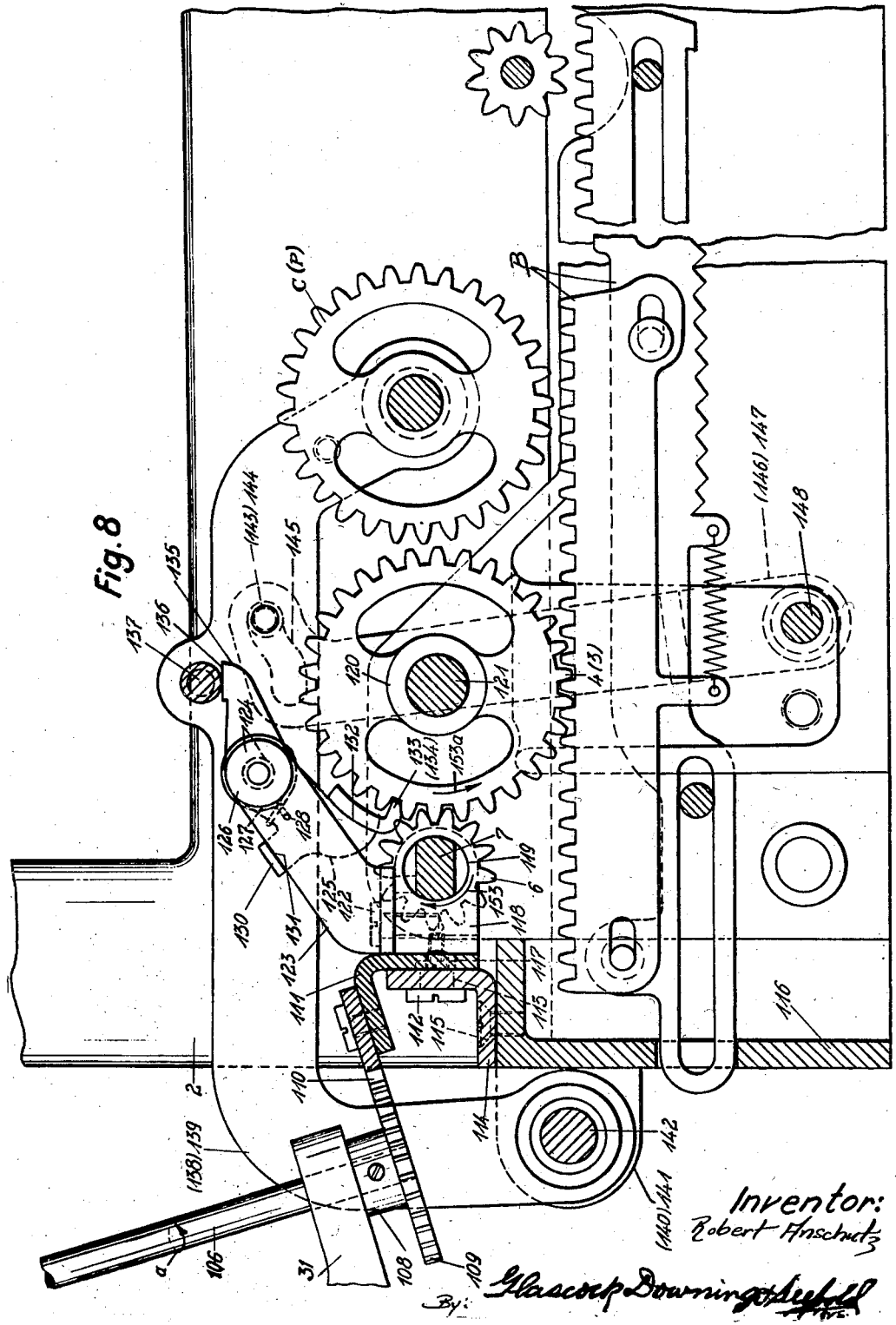

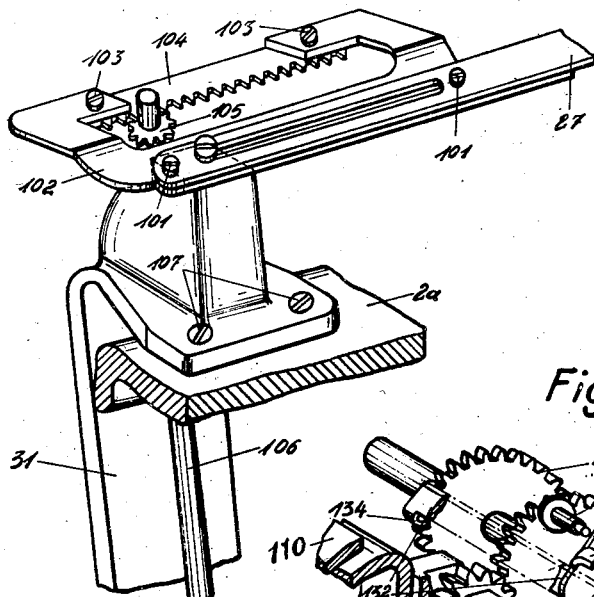

June 26, 1945.    R. ANSCHÜTZ    2,378,902
TYPEWRITING CALCULATING MACHINE
Filed April 30, 1941    10 Sheets-Sheet 8
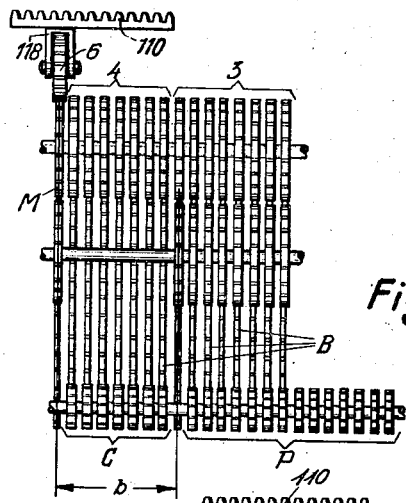
Fig. 10
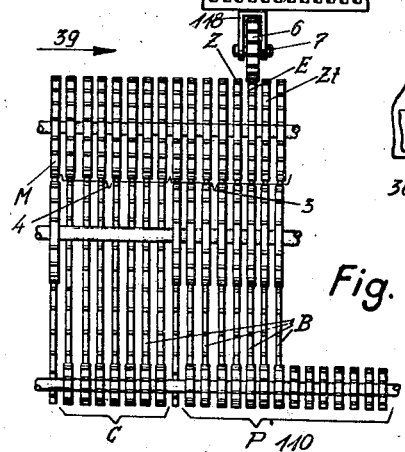
Fig. 11
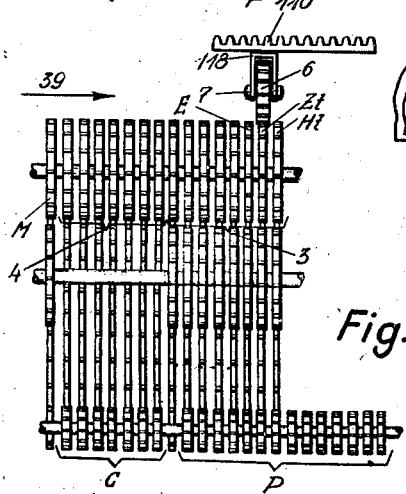
Fig. 12
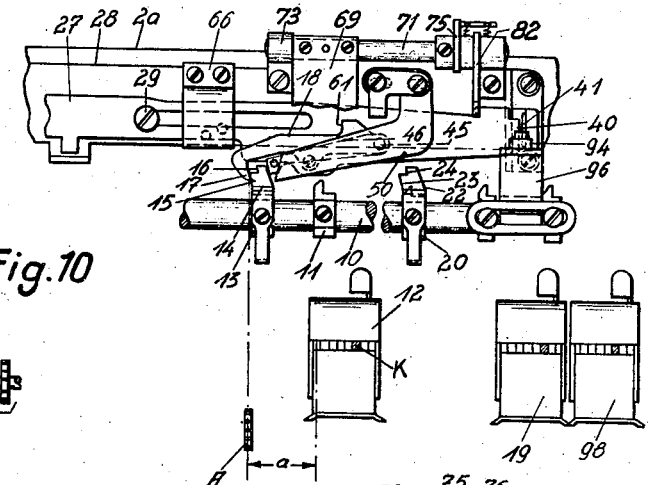
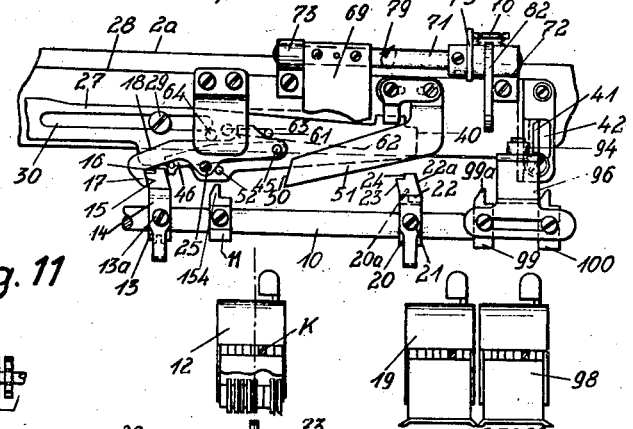
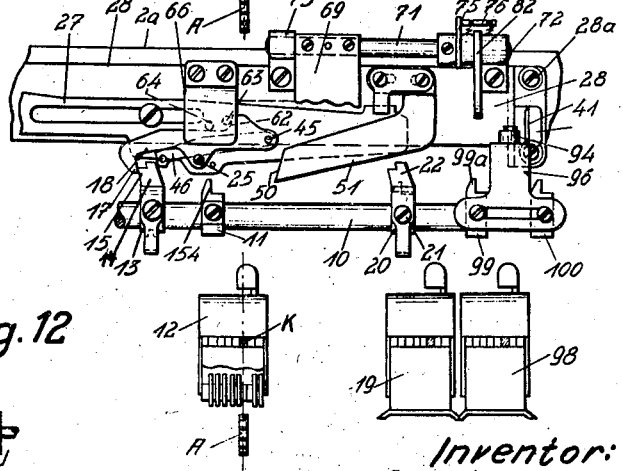
Inventor:
Robert Anschütz
By: Glascock Downing Seibold
Attys.

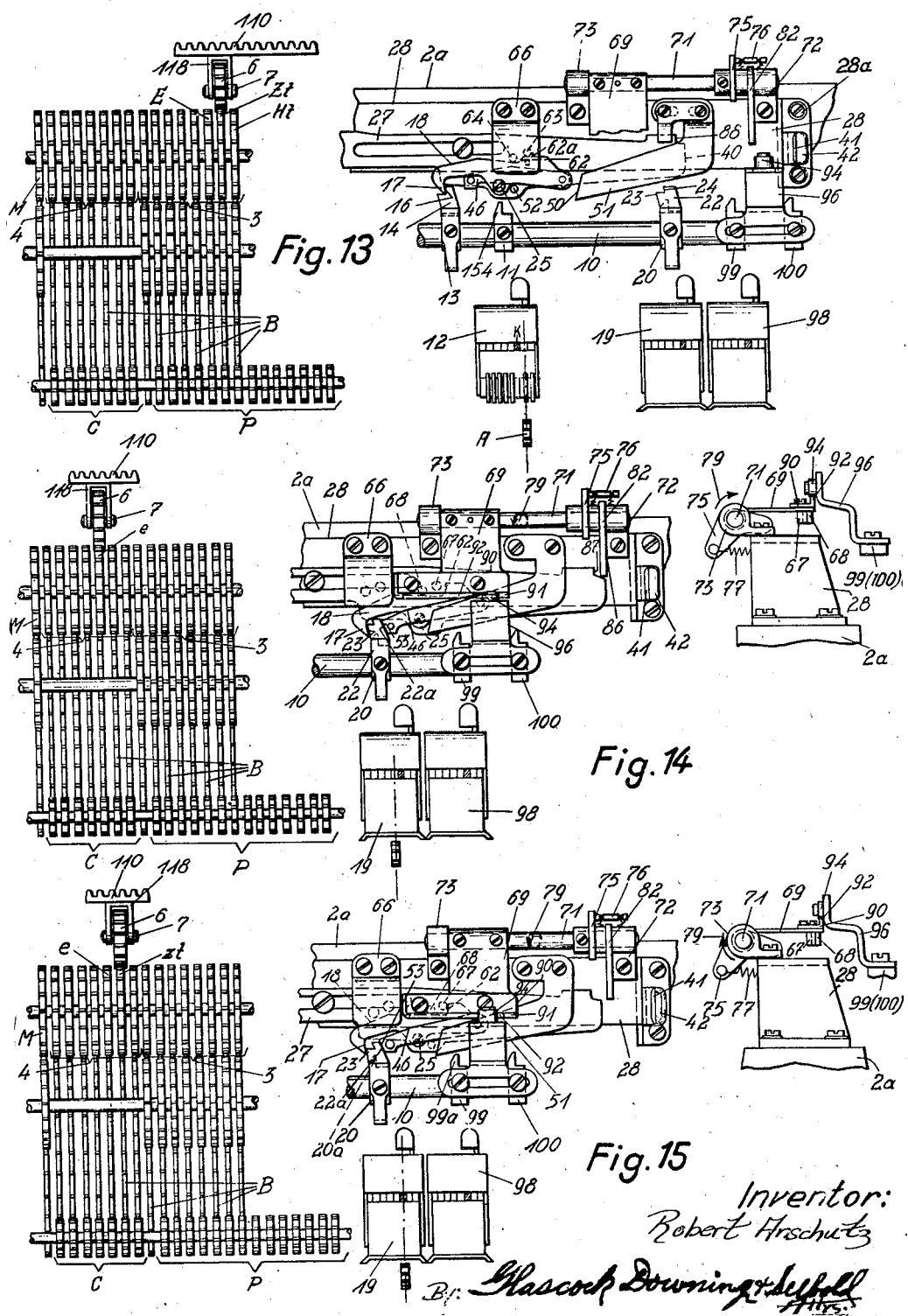

June 26, 1945.   R. ANSCHÜTZ   2,378,902
TYPEWRITING CALCULATING MACHINE
Filed April 30, 1941   10 Sheets-Sheet 10
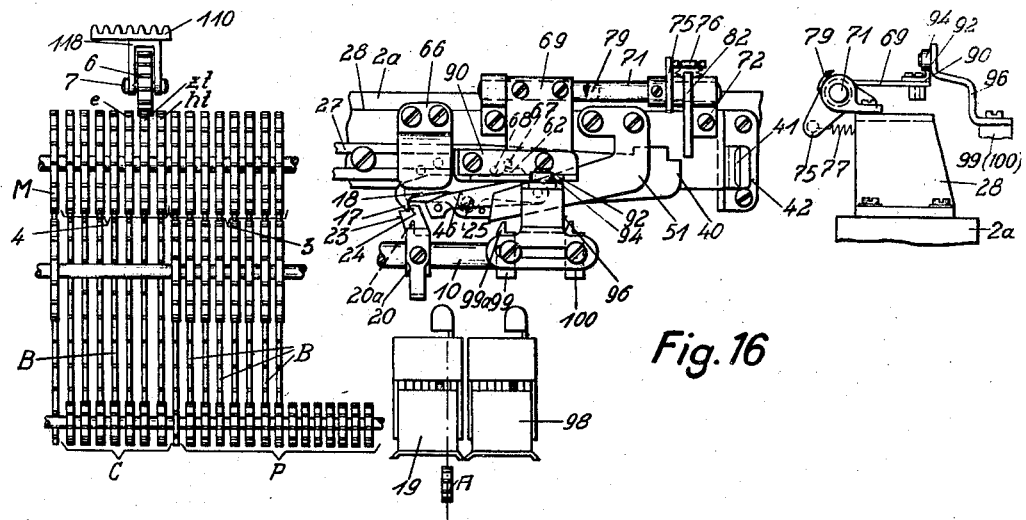
Fig. 16
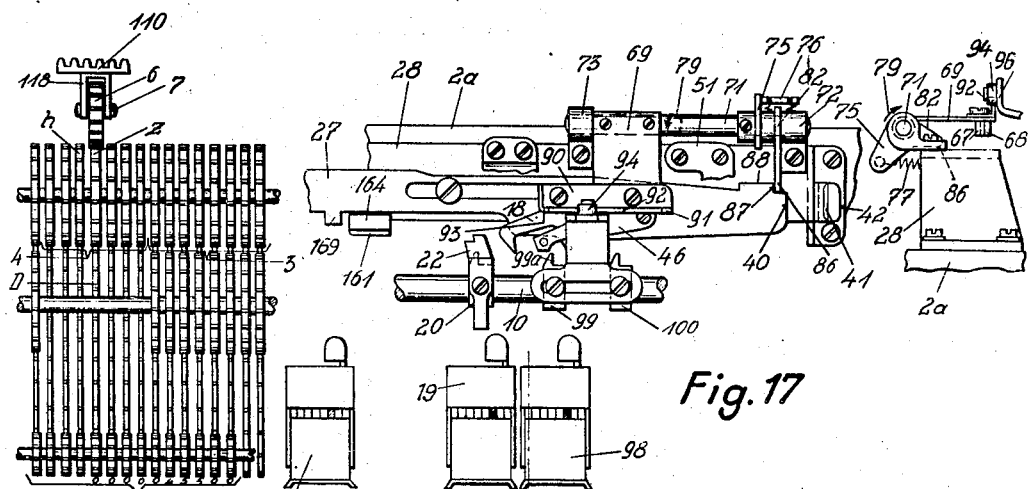
Fig. 17
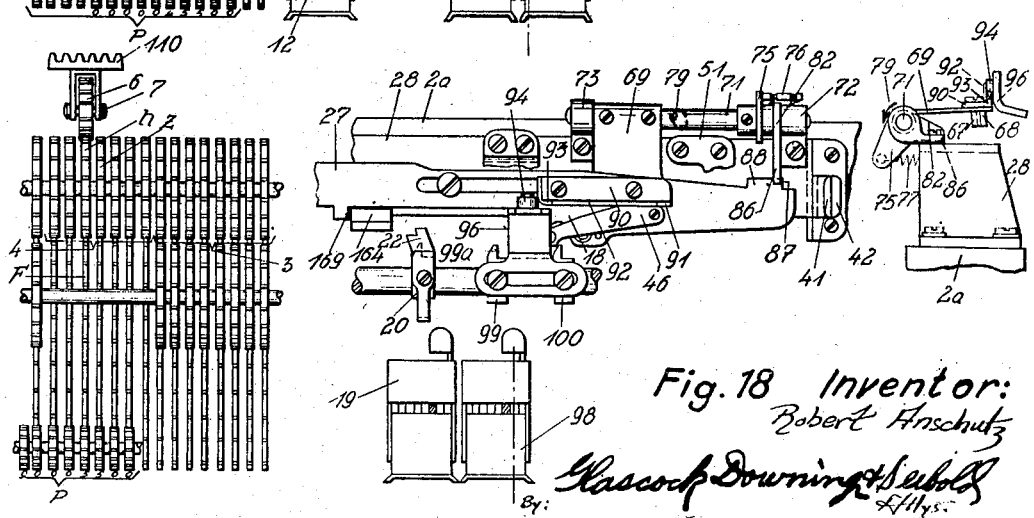
Fig. 18   Inventor:
Robert Anschütz
By Hascock Downing & Seibold
Attys.

Patented June 26, 1945

2,378,902

UNITED STATES PATENT OFFICE 2,378,902

TYPEWRITING CALCULATING MACHINE

Robert Anschütz, Zella-Mehlis, Germany; vested in the Alien Property Custodian

Application April 30, 1941, Serial No. 391,202
In Germany May 15, 1940

11 Claims. (Cl. 235—59)

This invention relates to typewriting-calculating machines equipped with automatic decimal space skipping means.

In the typewriting-accounting machine art, as is well known, it is customary to provide the accumulator with punctuation spaces, each of which is equal to a step of travel of the paper carriage, and so located between the denominational wheels of the accumulator, as to "point off" the amount registered on the wheels.

When, in the step by step travel of the accumulator and its master actuator relatively to each other, one of these punctuation places is brought into the adding zone, that is to say, positioned in registry with the master actuator as a result of the usual step movement of the carriage, it has been customary to provide means for automatically tripping the carriage escapement mechanism to effect a second immediately successive step of movement of the carriage for the purpose of bringing the wheel of next lower denomination and the master actuator into registry.

Accumulators or registers, the denominational wheels of which are arranged seriatim with no intervening punctuation or "pointing off" spaces are well known, but where it is desired to associate an accumulator having punctuation spacing with a register not so provided, both mechanisms being under control of the paper carriage for the simultaneous entry or withdrawal of digits on the wheels of corresponding denominations in the respective mechanisms, gross inaccuracies would occur unless provision is made to compensate for the extra spacing occurring as a result of the "comma-skipping" of the carriage in relation to the accumulator.

One object of the present invention is to provide a novel means for coordinating a non-punctuated set of denominational elements to a punctuated set of denominational elements, whereby to enable the proper denominational digits of an amount to be simultaneously entered or withdrawn on the corresponding denominational elements of both the punctuated and the non-punctuated sets.

To this end I contrive to offset the effect of the extra step of movement of the paper carriage past the punctuation space, by providing what may be called a limited lost motion connection between the carriage and the set of non-punctuated denominational elements, which results in a non-transference of motion to the actuator for the non-punctuated set, during the second step of movement of the carriage.

Other objects and advantages will be referred to in the following specification, and particularly pointed out in the claims.

In the accompanying drawings one form of carrying out the invention is shown by way of example, viz:

Fig. 5 is a plan view of a section of Fig. 3, upon an enlarged scale.

Fig. 6 shows the coupling connection between the paper carriage and the coupling rod system in the direction of carriage movement.

Fig. 7 shows the parts according to Fig. 6 during the return of the carriage.

Fig. 8 shows a section of Fig. 2 upon an enlarged scale.

Fig. 8a is a perspective view of individual parts according to Fig. 8, viewed from the left rear of the machine, these parts being drawn apart for better display.

Fig. 9 is a perspective view, from the left front, of the gears between the coupling rods and the means for registering the values in the multiplying mechanism.

Figs. 10 to 18 show in schematic view various positions of the device in accordance with the invention as follows:

Fig. 10 shows that position in which, on tabulating, the driving connection is established between the paper carriage and the device for the purpose of entering the multiplicand.

Figs. 11 to 13 show, respectively, the positions assumed by the compensating mechanism before, during and after the skipping of the comma position when entering the multiplicand.

Figs. 14 to 16 shows, respectively, the positions assumed by the compensating mechanism before, during and after the skipping of the comma position when entering the multiplicator, and Figs. 17 and 18 shows the positions assumed by such mechanism before and after the comma position during the product total-taking.

GENERAL DESCRIPTION

Figure 1:
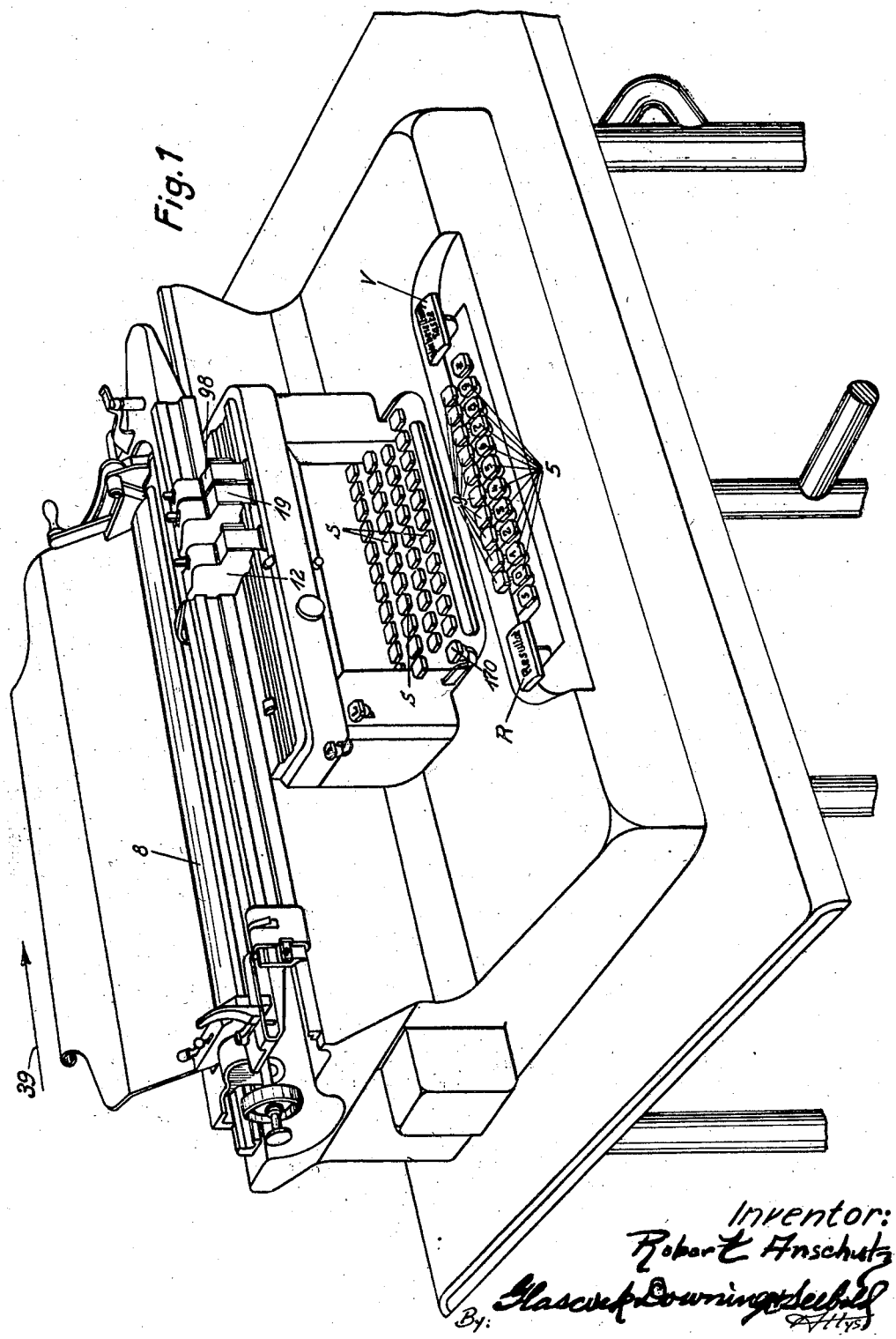
Fig. 1 shows a perspective view of a typewriting-calculating machine including the device according to the invention.

The present device according to the invention is for use on a typewriting-calculating machine having an automatic total-taking device, which besides the conventional state control (addition, subtraction) is also equipped for multiplication. A multiplying mechanism 1 (Fig. 3) suitable for forming the product from two factor values is preferably mounted on the left beside the machine frame 2. The factor values are suitably entered order by order in the denominational gear systems provided for this purpose within said multiplying mechanism 1 (multiplicand gear 3 and multiplicator gear 4) by way of the conventional calculating keys 5 (Fig. 1) depressed during normal calculations (addition and subtraction) and by means of the customary total-taking control device (not shown).

Figure 2:
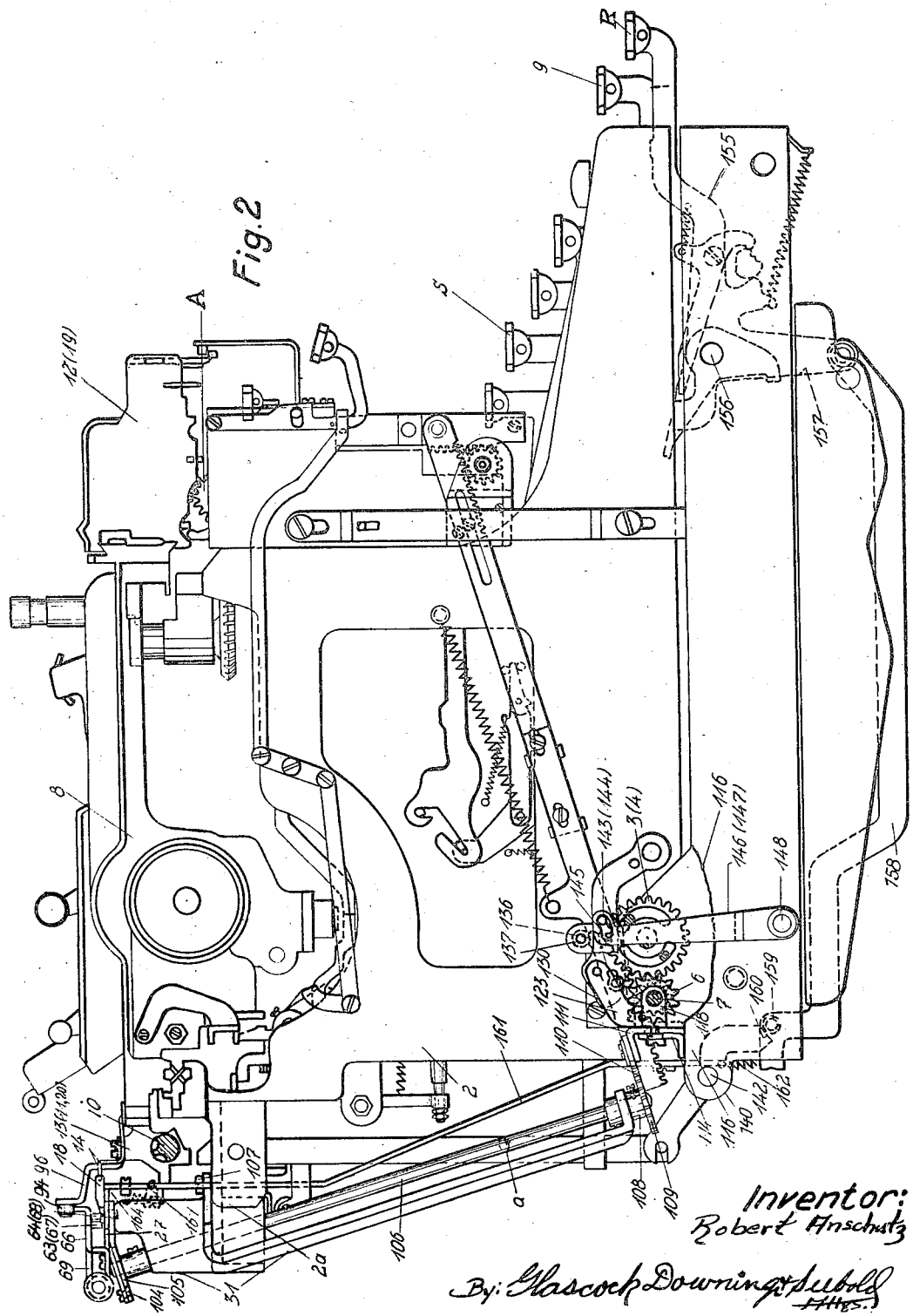
Fig. 2 shows a left-hand side view of the typewriting calculating machine, the housing and some parts being shown broken away.
Figure 3:
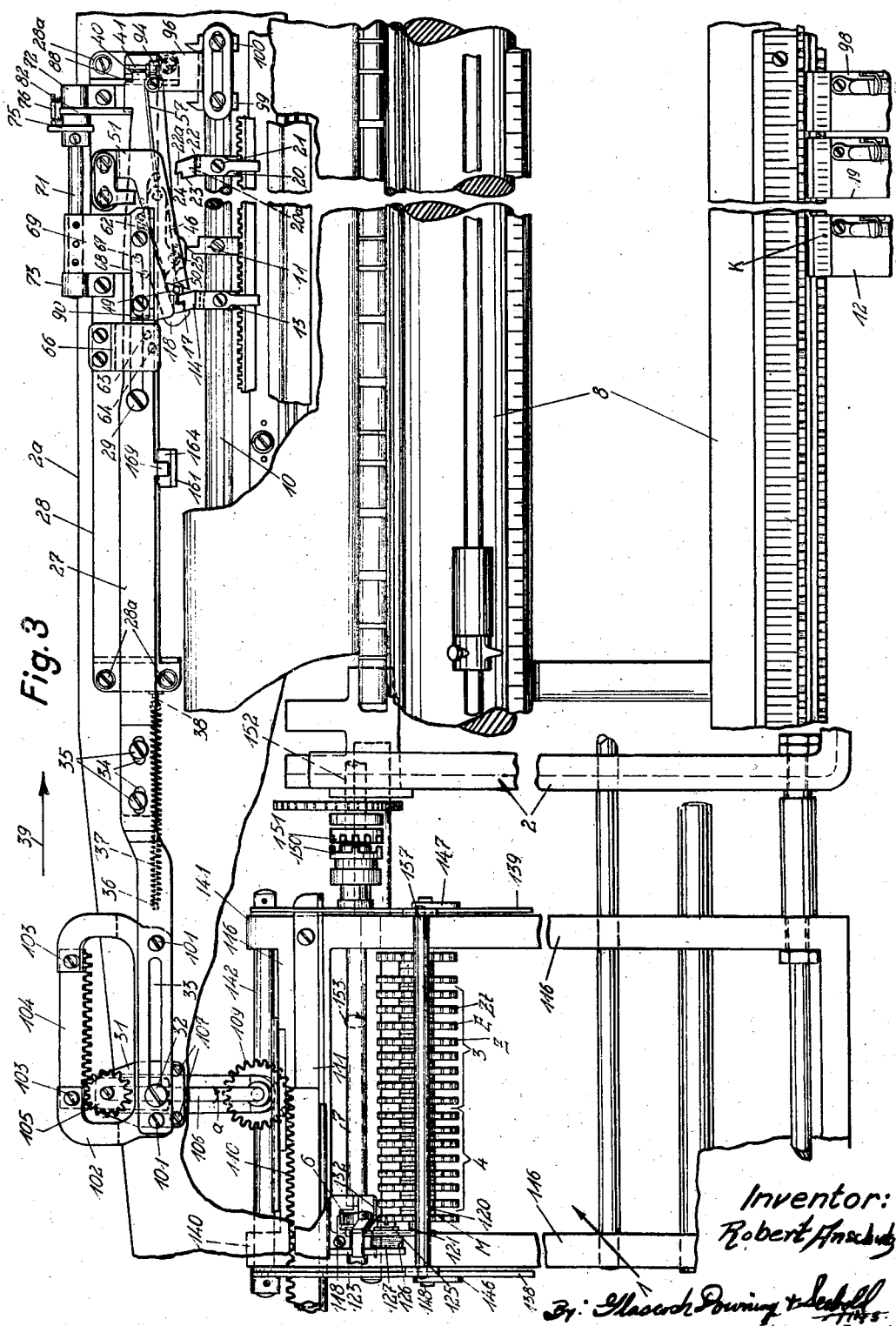
Fig. 3 shows a plan view of a part of the paper carriage and the multiplying mechanism of the typewriting-calculating machine, in which for better display, some parts are broken away, the parts being shown in their rest positions.

The entry order by order of the factor values into the multiplying mechanism 1 (Fig. 3) and after their product has been computed, the removal of the product value from the multiplying mechanism 1, is effected by way of a registering wheel 6 (Figs. 2, 3, 8). The latter is mounted to slide but not to revolve on a shaft 7 driven by the total-taking control mechanism of the typewriting-calculating machine and is moved step by step by the mechanism according to the invention under control of the paper carriage movement with respect to the gear wheel of one of the series of gears 3 or 4 (Figs. 8 and 3) corresponding to the decimal order selected during the tabulating of the paper carriage 8. The gear system 3 consists of eight wheels arranged in parallel by decimals by means of which any desired multiplicator is entered by decimals into the multiplying mechanism.

The device according to the invention is arranged as follows:

Arrangement of the coupling device

As is known, in order to limit a left-hand movement of the paper carriage 8 which has been started by depressing the respective tabulator key of a decimal tabulator keyboard 9 (Fig. 1), corresponding tabulator riders are set on a tabulator rider bar 10 (Figs. 2 to 4) arranged at the rear of the paper carriage 8. A similar tabulator rider is also set on the rider bar 10, opposite the column totalizer 12 intended for storing the multiplicand value, in such a position relatively to the totalizer that as soon as the carriage shifts the column totalizer 12 to locate its comma position K (Fig. 10) into operating position opposite the master wheel, the rider 11 by its lug 154 (Fig. 4) will positively release the paper carriage 8 to move one step towards the left so that automatic skipping of the comma is effected. A similar rider 13 is mounted to the left, as viewed from the front of the machine, of the tabulator rider 11 at a distance marked $a$ in Fig. 10. The distance marked $a$ which is limited on one side by the driving or master gear A of the calculating mechanism of the machine and on the other side by the highest calculating order wheel of the column totalizer 12 storing the multiplicand, corresponds to the distance $b$ extending from the point M of the multiplying device controlling the multiplication to the highest order of the multiplicand gear system 3. It should be noted, however, that the latter rider 13 does not cooperate with the decimal tabulator device of the typewriting-calculating machine.

Figure 4:
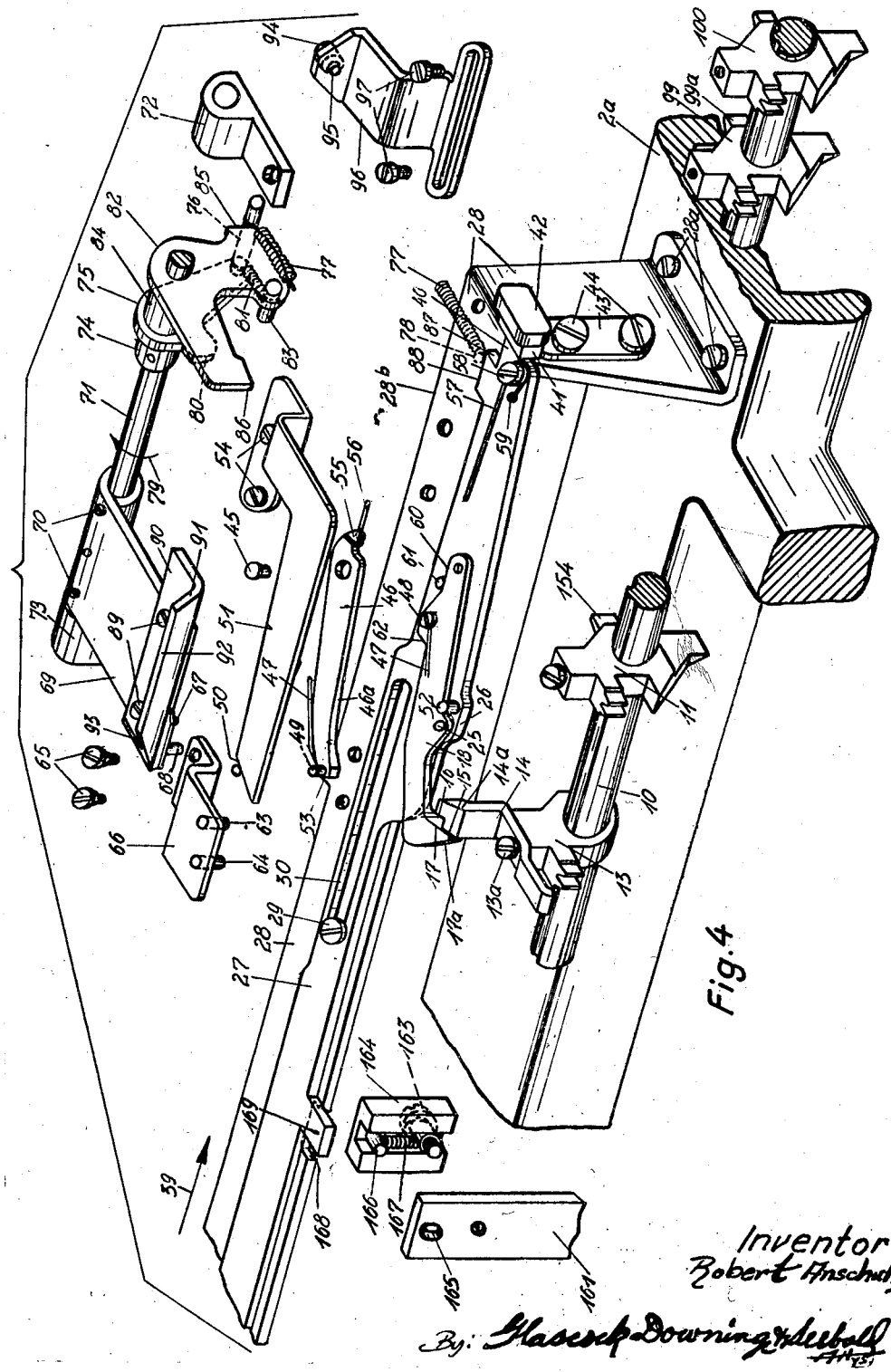
Fig. 4 is a perspective view, from the right front of the machine, of the coupling device of the paper carriage, and part of the coupling rods according to Fig. 3, some parts being drawn apart for better illustration.

A coupling hook 14 is screwed to said rider 13 by means of a screw 13a (Fig. 4). This hook 14 at its upwardly and rearwardly bent portion is recessed to provide a coupling shoulder 15 as well as a second coupling shoulder 16 which is offset towards right the length of one step of the paper carriage. The shoulder 15 during the tabulating into the operating position of one of the calculating orders of the column totalizer 12 to the left of the comma position K engages a lug 17 of a pawl 18 whereas this lug 17 of the pawl 18 is engaged by the coupling face 16 of the coupling hook 14 during the comma skip, and as the calculating places of the column totalizer 12 to the right of the comma position K are moved into operating position.

Opposite the column totalizer 19 for storing the multiplier, another tabulator rider 20 (Fig. 3) corresponding to the rider 11 is set on the tabulator rider bar 10 in such a position relatively to totalizer 19 that as soon as the comma position of the totalizer moves into operating position, the rider 20 with its lug 20a will positively start a shifting step of the paper carriage 8 towards left for the purpose of automatically skipping the comma position. A notched coupling hook 22 is fixedly screwed to this tabulator rider 20 at 21 in such a way that its coupling shoulders 23 and 24 can also cooperate with the lug 17 of pawl 18. The pawl 18 (Figs. 3 to 5) is mounted to swing on a projection 26 of a slide 27 by a screw 25. The slide 27 is mounted to slide horizontally on a U-shaped supporting bridge 28. For this purpose a headed screw 29 screwed into the supporting bridge 28 projects through a longitudinal slot 30 of the slide 27 and another headed screw 32 screwed into a supporting member 31 (Fig. 3) extends through a second longitudinal slot 33 of the slide 27. Preferably the slide 27 comprises two parts which can be adjusted by means of screw-slot connections 34, 35 to form an integral unit. One end of a tension spring 37 is fastened to a pin 36 riveted in the slide 27. The opposite end of said spring is hooked in a suspension bar 38 which is fastened to the supporting bridge 28. This spring 37 constantly tends to move the slide 27 towards the right (arrow 39) which movement is limited by the right hand end 40 (Figs. 3 and 4) of slide 27 striking against a rubber stop 41. The cushioned stop 41 is fastened in a metal box 42 which, by means of screws 44 protruding through its downward extended arm 43, is screwed to the supporting bridge 28. This bridge is itself mounted on the rear supporting bar 2a of the machine frame 2 at 28a. A locking pawl 46 is mounted to swing on the right hand arm of the above-mentioned pawl 18 (Figs. 3 and 5) at 45. The locking pawl 46 supports one arm of a torsion spring 47 coiled around a screw 48 threaded into the pawl 18 and constantly tending to move the pawl 46 anticlockwise around the pivot 45. When the slide 27 is in normal position, however, (Figs. 4 and 5), a pin 49 riveted into the locking pawl 46 is supported by a bevel 50 of a control member 51 thus preventing any further movement of the locking pawl 46. When, however, this locking 49, 50 is released, as will be described later, the torsion spring 47 moves the locking pawl 46 anticlockwise around the riveted pin 45 so that the front edge 46a of the pawl 46 will strike against a stop pin 52 riveted into the slide 27. In this position the locking pawl 46 by means of its slanted edge 53 can cooperate with one of the chamfered edges 14a or 22a of the coupling riders 14 or 22. The control member 51 is screwed to the supporting bridge 28 at 54.

The right hand end 55 of the locking pawl 46 is shaped like a hook to which the longer arm 56 of a torsion spring 57 is connected. The torsion spring 57, which is coiled around a screw 58 threaded into the slide 27 with its short arm projecting into a bore-hole of the slide 27, tends to move the locking pawl 46 anticlockwise around the riveted pin 45. Owing to the lock 49, 50, pawl 46 cannot normally participate in this movement, so that the tendency of the torsion spring 57 will be transferred to the pawl 18 by way of the rivet connection 45, causing the pawl to swing anticlockwise around the screw 25 until in its rest position the right-hand arm of the pawl 18 by its rear edge 60 strikes against a pin 61 fastened in the slide 27.

The pawl 18 also has a slanting edge 62 which when entering the multiplicand, at the moment of skipping the comma position K (Figs. 11 and 13) provided in the column totalizer 12 storing the multiplicand, cooperates with a pin 63 (Figs. 4 and 5) and, after the entry of the multiplicand has been completed, with a pin 64, which pins are relatively offset and depend from a supporting member 66 screwed to the supporting bridge 28 at 65 and overhanging the path of the shoulder 62. The pins are spaced from each other by the distance of two steps. When entering the multiplier, the slanting shoulder 62 of the pawl 18, at the moment of skipping the comma position provided in the column totalizer 19 storing the multiplier, engages a pin 67, and after the entry of the multiplier has been completed it engages, a pin 68. These pins 67 and 68 are arranged in the same manner as the pins 63 and 64 but depend from a swinging flap 69, the pins 67 and 68 whilst the flap is in normal position, lying outside of the pathway of the shoulder 62 of the pawl 18, as will be hereinafter explained. The flap 69 is fastened on a shaft 71 as at 70 and said shaft 71 is mounted to revolve in two supports 72 and 73 fastened on the supporting bridge 28. A depending crank 75 is also rigidly mounted on the shaft 71 by a hub 74. A spring suspension pin 76 is riveted to said crank 75, and engaged by one end of a spring 77 whose opposite end is suspended from a pin 78 fastened in the supporting bridge 28, the spring influencing the members 75, 71 and 69 in the direction of arrow 79, Fig. 4, until in its normal position a lug 80 of the crank 75 strikes against the rear edge 28b of the supporting bridge 28. Suspended from the pin 76 of the crank 75 is another spring 81 the other end of which is fastened to a pin 83 riveted to a locking lever 82. The locking lever 82 is mounted to swing on the shaft 71 by means of a hub 84 and is constantly influenced around the shaft 71 in the opposite direction of arrow "79" by the above-mentioned tension spring 81 until in the rest position its face 85 strikes against the pin 76. The locking lever 82 is also provided with a locking catch 86 which at the right moment is capable of cooperating with the right hand edge 87 of a lug 88 mounted on the slide 27.

A rail 90 is screwed on the flap 69 at 89 (Fig. 4). This bar 90 is bent upwards at its front part to provide a cam surface 91, a horizontal surface 92 and another cam surface 93. These control surfaces 91, 92, 93 of the rail 90 can cooperate with a roller 94 (Figs. 2 to 4) mounted to revolve on the upper end of a supporting bracket 96 by means of a rivet 95 (Fig. 4). The said bracket 96 is mounted for adjustment by means of screws 97 on the tabulator rider 99 set on the tabulator bar 10 opposite the column totalizer 98 storing the product on another tabulator rider 100.

*Arrangement of the setting mechanism for the registration wheel 6*

A U-shaped member 102 is fastened at the left end section of the slide 27 by means of screws 101 (Figs. 3 and 9) and a rack 104 is screwed to said U-shaped member 102 by means of screws 103. The teeth of this rack are in mesh with a cog wheel 105, having, e. g. 12 teeth, which is fastened to the upper end of a shaft 106 (Figs. 2, 3 and 9), mounted to rotate in the supporting member 31 previously mentioned which is screwed to the rear supporting bar 2a of the machine frame 2 at 107. At the lower end of shaft 106 (Figs. 2, 3, 8 and 9) a cog wheel 109 with e. g. 20 teeth is rigidly mounted by a sleeve 108. Said toothed wheel 109 is in mesh with a rack 110 screwed on the slanted part of a slide 111 referred to henceforth as "sliding carriage 111." By means of the headed screws 112 (Fig. 8), the heads of which move in guide slots 113 of a rectangular bar 114, the sliding carriage 111 is mounted to slide on the bar 114, in horizontal direction. The bar 114 is fastened to the rear section of the frame 116 containing the multiplying mechanism, by screws 115.

A U-shaped setting member 118 (Fig. 9) is also fastened to the sliding carriage 111 at 117 (Fig. 8), which by means of bore holes 119 (Fig. 8) drilled in its arms encircles with little play the shaft 7 of the multiplying mechanism 1 (Fig. 3). The registering wheel 6 is mounted to slide but not to revolve on the shaft 7 between the two arms of the setting member 118. Consequently, wheel 6 is forced to participate in the horizontal movement of the sliding carriage 111 meshing consecutively with each of the toothed wheels of the gear systems 3 and 4 (Figs. 2, 3 and 8).

In the normal position of the coupling rod system 18, 27, 106, 111, the registering wheel 6, as may be seen on Fig. 3, is in mesh with the toothed wheel M controlling the multiplication proper, and mounted to the left of the multiplier train of wheels 4.

The individual toothed wheels of the gear systems 3 and 4 are loosely mounted to turn side by side on a shaft 121 fixed in the frame 116 of the multiplying mechanism 1 by means of their hubs 120 (Fig. 3). Consequently, the abutting ends of said hubs 120 of the adjoining gears will rub against each other so that it might be possible for the adjoining wheels to the left and to the right of one particular wheel in the train of wheels 3 and 4 to rotate with the driven gear so that certain values are registered unintentionally. In order to avoid such faulty registrations, the following device has been provided.

*Device for preventing the frictional turning of wheels adjoining the wheel to be revolved within the train of wheels 3 and 4*

A bent supporting member 123 is mounted on the setting member 118 (Figs. 3, 8 and 8a) at 122 (Fig. 8). A catch pawl 125 by means of its hubs 126 is mounted to swing on a headed screw 124 which is screwed in the forwardly bent part of the supporting member 123. A coil spring 127 is wound around the hub 126 of the catch pawl 125. One arm of said spring 127 is fastened in a bore hole 128 of the supporting member 123, whilst its other arm rests on the catch pawl 125. The coil spring 127 tends to move the catch pawl 125 constantly anticlockwise around the screw 124 (Fig. 8) until in the rest position a bent lug 130 of the pawl 125 contacts the upper edge 131 of the supporting member 123. The catch pawl 125 (Figs. 8 and 8a) carries a laterally projecting flange 132 having two catch teeth 133 and 134 which enter between the teeth of those gears of the gear system 3 and 4 which adjoin the particular gear in mesh with the registering wheel 6.

The catch pawl 125 is also provided with a forwardly extending arm 135, the upper edge 136 of which is in slight contact with a bar 137 (Figs. 3 and 8) mounted at the left in a lever 138 (Figs. 3 and 8) and at the right in a lever 139. Both levers 138 and 139 are fastened rigidly on a shaft 142 rotate in the supporting ears 140 and 141 of the frame 116. The lever 138 (Figs. 2, 3 and 8) has a laterally extending pin 143 and the lever 139 has a similar pin 144 which pins protrude through curved longitudinal slots 145 of the levers 146 and 147 mounted on a shaft 148 supported in the frame 116. The shaft 148 and the levers 146 and 147 can be moved clockwise (Fig. 8) by suitable means, not shown when depressing an operating key R (Fig. 1), whereby the multiplying process, that is, the calculating of the product, is started. If this is the case, the pinslot connections 145, 143 and 145, 144 as well as the members 137, 138, 139 and 142 are likewise moved clockwise (Figs. 2 and 8) around the pivots 140, 141. Simultaneously the bar 137 acts upon the edge 136 (Fig. 8a) of the arm 135 of the catch pawl 125, moving the latter against the coil spring 127 clockwise around the screw 124. Accordingly, the catch teeth 133 and 134 of the catch pawl 125 move out of the teeth of adjacent gears of the gear systems 3 or 4, just locked by them, so that these toothed wheels are released for rotation. This is necessary since when calculating the product, the individual wheels of the gear systems 3 and 4 are revolved simultaneously more or less by means of their respective racks B, (Figs. 8 and 10) not explained in detail.

When the operating key (R), which starts the multiplication, is not depressed, the above-mentioned members remain in their normal positions, Fig. 8, so that those toothed wheels of the gear systems 3 or 4, respectively, which are located to the right and left of the toothed wheel in mesh with the registering wheel 6, are prevented from turning.

OPERATING METHOD OF THE COUPLING DEVICE

*Entering of the multiplicand*

The method of operating the device according to the invention will be explained for better understanding by way of a simple multiplication chosen at random, as follows:

3,25 × 1,40

It should be noted that in the following the order to the left of the comma will be referred to as "units order" and the orders to the right of the comma as "tenths" or "hundredths orders."

First, the conventional preparations are made for performing bookkeeping operations on the typewriting-calculating machine and the paper carriage 8 is brought into its extreme right hand position. Then a preparatory key V (Fig. 1) is depressed, whereby the typewriting-calculating machine is set for multiplication.

By depressing the key corresponding to the units order of the decimal tabulator keyboard 9, the paper carriage 8 with its column totalizers 12 mounted thereon, is shifted leftwardly in any conventional manner until arrested when the units order of the appropriate column totalizer is in operative relation with the master gear A (Fig. 11) in which the multiplicand value "3,25" is to be stored.

With reference to the amount "3,25" it is to be understood that the term "units order" relates to the units of dollars order, rather than the units of cents order which is regarded as the hundredth order.

During this movement towards the left of the paper carriage, the coupling element 14 in the position of the paper carriage shown in Fig. 10 with its coupling edge 15 engages the hook 17 of the pawl 18 so that the coupling members 18, 27, 46, (Figs. 4, 5) thereby participate in the further movement of the paper carriage towards the left. At the beginning of the movement of the members 18, 27, 46, etc., the pin 49 of the locking pawl 46 escapes from the oblique edge 50 of the control member 51. Consequently the locking pawl 46 is turned anticlockwise around its pivot 45 by the spring 47 and then lies with its front edge 46a against the pin 52. Simultaneously the locking pawl 46 in this position comes to lie with its edge 53 against the edge 14a (Fig. 6) of the coupling element 14. In this way a safe coupling connection between the rider 13 and the coupling members 18, 27, 46 is established in both directions of movement of the carriage.

During the leftward movement of the coupling members 18, 27, 46, the spring 37 (Fig. 3) is tensioned. Simultaneously by means of the rack 104 (Figs. 3 and 9) of the slide 27 the toothed wheel 105 in mesh with the said rack as well as the shaft 106 and the toothed wheel 109 mounted on same are revolved anticlockwise (arrow a). The latter moves the rack 110 with which it is in mesh and thereby also the sliding carriage 111 (Fig. 9) towards the right (direction of arrow 39) opposite to the direction of the tabulating movement of the paper carriage 8, whilst the headed screws 112 (Fig. 8) screwed into the same slide in the guide slots 113 (Fig. 9) of the angular rail 114.

It will be noted that owing to the different numbers of teeth of the toothed wheels 105 and 109, the extent of movement of the sliding carriage 111 is greater than that of the paper carriage 8.

The setting member 118 with the registering wheel 6 participates in the movement towards the right of the sliding carriage 111. That particular tooth of the registering wheel 6 which happens to lie in line with interdental spaces of the single gears of the gear systems 4 and 3 consequently slides past the toothed wheels of the multiplier gear system 4 and then past the higher denominational orders located to the left of the units-orders of the multiplicand gear 3 and finally at the end of its rightward movement, meshes with the units-gear E of the multiplicand gear 3 (Fig. 11). At this moment the tabulating movement towards left of the paper carriage 8 as well as the movement towards left of the coupling members 18, 27, 46, 104, the movement of the members 105, 106, 109 in the direction of the arrow a and the movement towards right of the members 110, 111, 118 and 6 are finished. Consequently the units-orders of the column totalizer 12 and the registering wheel 6 are now in operating position, the latter being opposite the units-place E of the multiplicand gear 3.

The supporting member 123 (Fig. 8a), and therewith the catch pawl 125 also participated in the movement towards right of the setting member 118. At the end of the tabulating and setting movement of the members 111, 118 and 6, as shown in Fig. 11, the left tooth 133 (Fig. 8a right) of the catch pawl 125 now meshes with the gear (tens wheel Z) located on the left of the units-place E (Fig. 11) of the gear system 3 and the right tooth 134 of the catch pawl 125 meshes with the gear (tenths wheel ZT) located on the right of the units wheel E of the multiplicand gear 3. Consequently, the adjoining gears to the right and left of the units gear E of the gear system 3 are locked against any revolving movement and therefore cannot participate in any turning of the units wheel E.

The tabulating and setting movement of the paper carriage 8 and the registering wheel 6 finished, the calculating key marked "3" of the calculating keyboard 5 (Fig. 1) is depressed to register the "3" of the multiplicand "3,25." Consequently the conventional column totalizer mechanism of the machine is started, and the coupling 150, 151 (Fig. 3) between the registering wheel shaft 7 and the differential shaft 152 for the column totalizer 12, is closed. Then the known column totalizer shaft 152 is turned automatically by three units in the direction of the arrow 153. The shaft 17 (Fig. 8) and the registering wheel 6 also participate in this movement by means of the locked coupling 150, 151. Since the registering wheel is in mesh with the units wheel E of the gear system 3, as mentioned above, the units wheel E is likewise positively turned by three units in the direction of arrow 153a. This driving movement is now transferred by the units wheel E of the gear system 3 to the corresponding rack of the rack and gear system B of the multiplying mechanism.

Simultaneously with the registration of the "3" of the multiplicand value "3,25" in the multiplying mechanism, a "3" is also registered additively in the units dollars' order of the column totalizer 12 and the type-lever of the figure "3" is positively made to write upon the booking sheet directed around the platen of the paper carriage 8. The return of the type-lever then releases the carriage escapement device so that the paper carriage 8 under the influence of a carriage feeding mechanism, moves one shifting step to the left.

Owing to the coupling connection 14, 15, 17 (Fig. 11), 18, 46, the coupling 27, 104 (Fig. 3) are also positively moved towards the left a further shifting step against the spring 37. Thereby the shaft 106 by means of the gears 104, 105 is moved further in the direction of arrow a and consequently the sliding carriage 111 by means of the gears 109, 110, and also the setting member 118, the registering wheel 6 as well as the catch pawl 125 by the member 123 (Fig. 8a) are moved towards the right by one step (direction of arrow 39). The registering wheel 6 thereby comes into mesh with the tenths wheel Zt of the train of wheels 3 (Fig. 12).

Shortly before completion of this movement of the coupling members 18, 27, 46 by one step towards left, the edge 62 (Fig. 4) of the pawl 18, contacts with the pin 63 of the supporting member 66. Consequently, during the subsequent slight leftward movement of the members 18, 27, 46 until the completion of this one step movement, the pawl 18 and the pawl 46 are slightly moved clockwise around the pivot screw 25 against the spring 57, the coupling members 18, 27, 46 assuming the positions with respect to the member 14, as shown in Fig. 12. The distance covered by the pawl 18 in this case will only be a short one, so that the coupling connection 15, 17 for the time being remains intact.

The shifting step of the paper carriage towards left just described caused the comma position of the column totalizer 12 to be moved into operative position. As mentioned previously, the tabulator and comma rider 11 (Figs. 4 and 12) is located opposite this calculating place on the tabulator rail 10 and its catch 154 at this moment operates a distance skipping device, the just completed step to the left of the paper carriage 8 thus being succeeded by a further shifting step towards left by automatic and positive action. The coupling connection 15, 17, will, of course, impart to the coupling members a still further movement towards the left. At the beginning of the latter movement, the oblique shoulder 62 of the pawl 18 slides farther along the pin 63 of the supporting member 66. Consequently also pawl 18 and pawl 46 are moved farther around the pivot screw 25 against the spring 57. In doing so, the catch 17 of the pawl 18 slides off the edge 15 of the coupling element 14, so that the coupling connection 15, 17 for the coupling members is interrupted. At this moment the spring 37, which has previously been tensioned, takes effect and causes the coupling members 27, 18, 46 to be moved towards the right in the direction of the arrow 39.

Meanwhile the shifting step towards left (comma skipping) of the paper carriage 8 which, as previously mentioned, has been initiated by the catch 154 of the rider 11 takes place, so that now the paper carriage and the coupling members shift in opposite directions instead of traveling together. Such relative movement between the coupling numbers 18, 27, 46 and the coupling element 13, 14 is arrested by contact of the coupling hook 17 with the shouldered face 16 of the coupling element, at the end of one letter or denominational space, the hook 17 clinging to the face 16 (Fig. 13). It follows that the coupling members 18, 27, 46 and the driven members 104, 106, 110, 111, 6 (Fig. 3) mutually compensate for the comma skipping of the paper carriage 8, so that the registering wheel 6 is moved by only one step or letter space, whilst the paper carriage 8 and its column totalizers jump by two steps or letter spaces from the units of dollars' order of the column totalizer 12 across the comma place into the tenths place. This is done for the reason that, as known, no comma or vacant places have been provided in the multiplying mechanism in order to save space.

These operations completed, the tenths order of the column totalizer 12 as well as the tenths order ZT of the multiplicand gear system 3 are in their operating positions (Fig. 13).

Now the calculating key "2" of the calculating keyboard 5 (Fig. 1) is depressed in order to enter the "2" of the value "3,25," whereupon the gear of the tenths place ZT (Fig. 13) of the gear system 3 and the corresponding rack of the rack system B as well as the tenths wheel of the column totalizer 12 are advanced two steps and the type lever carrying the "2" is caused to print on the sheet carried by the platen. The subsequent return movement of the type lever releases the carriage for another letter space movement towards the left. Owing to the coupling connection 16, 17 (Fig. 13), the coupling members 18, 27, 46 participate in this leftward movement. Simultaneously the horizontal rear edge 62a (Fig. 13) of the pawl 18 slides along the pin 63, but this movement is not imparted to the pawl 18 itself.

Owing to the continued leftward movement of the coupling members 18, 27, 46, the sliding carriage 111, by means of the gear train 104 (Figs. 3 and 9), 105, 106, 109, 110, and the registering wheel 6 as well as the catch members 123, 125, are moved towards the right (direction of arrow 39) another denominational step which locates the hundredths order of the column totalizer 12 in operating position and the registering wheel 6 in mesh with the hundredths gear H$t$ of the multiplicand train of wheels 3. In this position of parts, the strip-off edge 62 of the pawl 18 engages from the right with the second strip-off pin 64 of the supporting member 66.

Now the key of the calculating keyboard 5 (Fig. 1) corresponding to the value "5" is depressed in order to enter the "5" of the multiplicand "3,25," whereby said value is entered into the hundredths order H$t$ (Fig. 3) of the multiplicand gear set 3 and the gear and rack system B, as well as into the hundredths order of the column totalizer 12, and the type lever corresponding to "5" is actuated.

The return type lever on its return releases the paper carriage for another letter spacer movement again and simultaneously, the coupling members 18, 27, 46 are likewise carried along towards left by the coupling connection 16, 17 (Figs. 3, 4 and 13). Consequently the oblique shoulder 62 of the pawl 18 slides past the pin 64 of the supporting member 66 whereby pawl 18 and pawl 46 are swung farther clockwise (Fig. 3) around the pivot screw 25 against the spring 57 (Fig. 4) whereupon the incline 17 of the pawl 18 clears the face 16 of the coupling element 14, so that the coupling system is set free. Through the action of the tensioned spring 37 (Fig. 3) the coupling members 18, 27, 46 at this moment are jerked smartly towards the right (direction of arrow 39) into their initial positions in accordance with Figs. 3 and 4, the right end 40 of the slide 27 striking against the sound deadening rubber stop 41 to arrest the parts. At the beginning of the movement of the members 18, 27, 46 towards the right, the rear edge 62a of the incline 62 of the pawl 18 slides off the pin 64, whereupon the pawl 18 and pawl 46 are moved anticlockwise around the pivot 25 by the spring 57. The movement of said pawl 18 is halted in the rest position by the rear edge or tail 60 striking against the pin 61 and the movement of the said pawl 46 is halted by the front edge 46a striking against the pin 52. The pawl 46 is again swung out clockwise against the spring 47 around the rivet pin 45 shortly before reaching the right end-position of the coupling system 18, 27, 46 by action of pin 49 sliding along the incline 50 of the control member 51 (Fig. 5) to locate the pawl 46 with its control or locking edge 53 outside of the path of movement of the coupling element 22 positioned on the bar 10 in the plane of the column totalizer 19 in which the multiplier is registered, whilst the pawl 18 with its bill 17 extends into the pathway of the catch 23 of the coupling element 22.

During the return movement of the coupling system 18, 27, 46 into rest position, simultaneously the sliding carriage 111 by means of the racks and gears 104, 105, 106, 109, 110 and the registering wheel 6, and the latch member 123, 125 are returned into the rest position towards the left, according to Fig. 3. In this position the registering wheel 6 is in mesh with the wheel M pertaining neither to the gear set 3 nor to the gear set 4.

*Entering of the multiplier*

After the multiplicand "3,25" has been registered in the multiplying mechanism of the bookkeeping machine in the above-described manner, that is, in the corresponding decimal orders of both the gear set 3 and the rack system B and stored in the column totalizer 12, the operator of the machine can write any desired text in the space between the column totalizer 12 and the column totalizer 19, by operating the keyboard 5 (Fig. 1). Then he depresses the units-tabulator key of the decimal tabulator keyboard 9, in order to enter the multiplier "1,40," whereby another leftward tabulating movement of the paper carriage results. During this movement, the coupling element 22 (Fig. 14) of the tabulator rider 20, having been set on the tabulator rail 10 opposite the column totalizer 19 in which the multiplier is to be registered, engages its catch 23 with the hook 17 of the pawl 18 and carries the coupling system 18, 27, 46 along towards the left tensioning the spring 37. The pawl 46 with its pin 49 now leaves the control member 50 and moving anticlockwise around the pivot against the spring 47, positions its edge 53 against the face 22a, of the coupling element 22, thereby ensuring the driving connection 23, 17 for entering the multiplier in the set of gears 4 (Fig. 14). It will be noted that the driving connection 23, 17 for entering the multiplier is established at a later moment than is the driving connection 15, 17 (Fig. 10) for entering the multiplicand in the tabulating motion, the delay being defined by the distance marked $a$ (Fig. 10), since the coupling hook 22 is secured directly on the tabulator and comma rider 20 for the column totalizer 19 and the registering wheel 6 does not have so far to travel, to engage the selected denominational gear of the gear set 4 corresponding with the digit of highest denominational value. The additional advance of the carriage through the distance $a$ was necessary, since the registering wheel 6 had to cover the additional distance C corresponding to the width of the multiplier value.

Owing to this leftward sliding movement of the coupling system 18, 27, 46 (Fig. 14), the carriage 111, by means of the gear train 104 (Figs. 3 and 9), 105, 106, 109, 110, and the registering wheel 6 as well as the locking members 123, 125, are simultaneously moved towards the right to position the registering wheel 6 with the units wheel $e$ of the multiplier gear set 4 (Fig. 14). At this moment the tabulating movement of the paper carriage 8 is completed and simultaneously the units wheel of the column totalizer 19 has been moved into its operating position.

Whilst the units wheel is moving into its operating position, the roller 94 (Figs. 2 to 5 and 14) of the supporting member 96, moves with the paper carriage 8 and simultaneously acts upon the cam surface 91 of rail 90 of flap 69 to rock the latter as well as the members 82 and 75 against action of spring 77 and in the opposite direction to the arrow 79 around the bearing brackets 72 and 73. Consequently the pins 67 and 68 of the flap 69 are moved into the pathway of the shoulder 62 of the pawl 18.

The tabulating process completed, the key marked "1" of the calculating keyboard 5 is depressed in order to enter the "1" of the multiplier "1,40." Thus the "1" by means of the differential shaft 152, gears 150, clutch 151, registering wheel shaft 7 and the registering wheel 6 is entered into the units-wheel e (Fig. 14) of the gear set 4 and by means of the corresponding rack of the rack system B is entered into the corresponding order of a multiplying mechanism C not explained in detail which is arranged beside the product mechanism P after the product gears C have been brought to mesh with the rack system 3. The value "1" is also entered into the units-wheel of the column totalizer 19 and by means of the corresponding type lever is typed upon the sheet on the platen. The type lever on its return then initiates the unusual escapement to feed of the paper carriage 8 one step and the carriage, because of the coupling connection 23, 17, advances the coupling system 18, 27, 46 one step to the left and hence, shift the registering wheel 6 one step towards right (Fig. 15) by means of the 104, 105, 106, 109, 110, 111, 118, to position the said wheel 6 in mesh with the tenths gear Zt of the multiplier gear set 4.

During the leftward step of the coupling system 18, 27, 46, the cam shoulder 62 of the pawl 18 contacts the pin 67 of the flap 69, whereby the pawls 18 and 46 against the action of spring 57 are moved slightly clockwise around the pivot screw 25 but the coupling connection 23, 17, is still maintained.

The paper carriage, as it escaped one step initiated by the return of the type lever, also caused the comma place of the column totalizer 19 to move into operating postiion. Consequently the distance-skipping device of the machine is operated under control of the catch 20a of the tabulator and comma rider 20, so that a further leftward step of both the paper carriage 8 and the coupling system 18, 27, 46 is automatically effected. During this automatic step the cam shoulder 62 of the pawl 18 slides off the pin 67 of the flap 69, whereby the pawls 18 and 46 are moved clockwise around the pivot 25 against the spring 57 and consequently the hook 17 of the pawl 18 clears the face 23 of the coupling element 22 and after a one step relative movement between the coupling mechanisms between the catch 18 and the carriage connects with the reduced face 24 (Fig. 16) which is set back the distance of one letter space from the face 23. Consequently the paper carriage 8 advances two steps, whilst the registering wheel 6 is moved one step only, so that now the tenths wheel of the column totalizer 19 is moved into operative position and the registering wheel 6 is in mesh with the tenths wheel ZT of the gear set 5.

In order to enter the "4" of the multiplier value "1,40," the particular key corresponding to the figure "4" on the calculating keyboard 5 (Fig. 13) is depressed, whereby the "4" is entered into the tenths gear Zt (Fig. 16) of the multiplier gears 4 which gear is driven as explained above. Simultaneously the "4" by means of the corresponding rack of the rack system B is also entered into the proper order wheel of the multiplying mechanism C as well as into the tenths wheel of the column totalizer 19, and is printed on the sheet held in the paper carriage. The subsequent step of the paper carriage 8 and of the coupling system (18, 27, 46) then moves the registering wheel 6 into mesh with the hundredths wheel Ht of the gear system 4 as the hundredths wheel of the column totalizer 19 is positioned into operative position. In this position the particular key of the calculating keyboard 5 corresponding to "0" is depressed, whereby no value is entered but the 0-type lever is moved initiating further leftward step of the paper carriage 8 as well as of the coupling system 18, 27, 46. Simultaneously the slanting cam 62 of the pawl 18 slides along the second pin 68 of the flap 69, whereby the pawls 18 and 46 are moved farther clockwise around the screw 25 against the spring 57 and consequently the hook 17 of the pawl 18 leaves the recessed face 24 of the coupling member 22. The movement towards left of the coupling system having tensioned the spring 37, the coupling members 18, 27, 46 now tend to move towards right again whilst the registering wheel 6 on the shaft 7 slides towards left under control of the gear train 104, 105, 106, 109, 110, 111, 118 (Figs. 3 and 9).

As soon as the hook 17 of the pawl 18 has been moved out of the path of the coupling member 22, the pawls 18 and 46 are restored by the spring 57 to their normal positions (Figs. 3 to 5).

The movement of the coupling system 18, 27, 46 towards the right (direction of arrow 39) and the movement of the sliding carriage 111 and the registering wheel 6 towards left is limited in that moment in which the registering wheel 6 is in mesh with the respective gear of the gear system 4 corresponding to the tens position Z (Fig. 17). This limitation takes places as follows:

*Setting of the coupling system during total-taking of the product*

When tabulating the column totalizer 19 into operative position—as already explained above— the flap 69 and the shaft 71 as well as its lever 75 are rocked clockwise by the roller 94 (Fig. 4) of the supporting bracket or member 96 against the action of spring 77 in the opposite direction of arrow 79. This rocking movement is transmitting to the locking lever 82 by the spring link connection 76, 81, 83 (Fig. 5) to contact the stop arm 86 of the locking lever 82 with the upper surface of the supporting bridge 28 (Fig. 17).

In the example under consideration, the hundredths digit of the multiplier (1,40) has been entered in the machine, and printed, the usual escapement advances the paper carriage one step, as a result of which the coupling system 18, 27, 46 is automatically released from the coupling member 24, and the coupling system is moved towards the right by the spring 37 until, the right side edge 87 of the projection 88 of the slide 27 contacts with the left side surface of the locking stop arm 86 of the locking lever 82 in order to check this movement. In this position, as illustrated in Fig. 17, the registering wheel 6 is now in mesh with the tens gear Z of the gear system 4, the reason for which will be hereinafter explained:

The shifting step of the paper carriage following the typing of the "0" of the multiplier "1,40" moves the column totalizer 19 into operative position with respect to its right control position. In this position a comma rider is suitably placed on the tabulator bar 10, which at this moment by means of its nose operates the distance skipping device of the machine, so that the paper carriage 8 is shifted by one further step. Consequently, after registering the hundredths digit of the multiplier value, the paper carriage is moved automatically two steps towards the left, the column totalizer 98, which later on receives the product, shifting therewith to mesh its highest calculating order wheel (Fig. 17) with the master wheel "A". The coupling system is not changed thereby in any way since the coupling connection has been disestablished as explained.

Now the result key R (Fig. 1) of the bookkeeping machine is depressed, whereby the product of the two factors, 3,25×1,40 that is "4,5500" is automatically calculated in the product mechanism P (Fig. 17) of the multiplying mechanism which does not belong to the invention and, therefore, is not shown. Simultaneously the multiplying mechanism automatically starts operation of the total taking mechanism of the bookkeeping machine, not shown. The total-taking from the product mechanism in the present case is effected first by means of the tens gear Z (Fig. 17) of the gear set 4 by means of the racks D of the rack system B located within their reach. Consequently the four highest denominations of the product register P remain idle during the product total-taking, which is due to the fact that the capacity of the column totalizer was selected for values having only nine places. Step by step axial movement of the product mechanism P towards the left is controlled by the total taking mechanism in a manner not shown. In this way all denominations of the product mechanism P corresponding to the units order and orders of higher magnitude are shifted one by one past the racks D (Fig. 17) and also past the tens order of the gear system 4, in order to be restored to "zero" by the total-taking process. Those denominations of the product mechanism which correspond to the tends and higher orders such as the hundreds, thousands, ten thousands positions and so forth, in case of the present product "4,5600" already stand at zero. Consequently, by means of a suitable device, not shown, for preventing the registration of zeros before integers, the printing of zeros on the sheet is made impossible. With the step by step axial shift of the product mechanism, the paper carriage 8 is also letter spaced step by step towards the left until the units wheel of the column totalizer 98 arrives in calculating position. It may be noted that during the previously mentioned step movement of the paper carriage 8, the roller 94 (Fig. 4) of the supporting member 96 is still rolling on the upper horizontal edge 92 of the rail 90 of the flap 69 and consequently the latter remains in the depressed position (Fig. 17), so that during the shifting of the paper carriage 8 the registering wheel 6 remains in mesh with the tens gear wheel of the gear set 4.

Owing to the above mentioned letter spacing travel of the paper carriage 8 and the product register P towards the left the particular gear of the product register P embodying the "4" of the product "4,5500" was also moved into a position opposite the rack D, that is, the tens gear Z of the gear set 4. Now, through the total-taking process, by means of the rack D and the tens gear Z of the gear set 4, the value "4" is entered from the said gear of the product mechanism into the units wheel of the column totalizer 98. Simultaneously the type lever prints the figure "4" upon the sheet on the platen. During the return of the type lever a step of the paper carriage is started, whereby the comma position of the column totalizer 98 is brought into its operative position. Owing to the fact that during the leftward step of the paper carriage 8 also the product mechanism P is positively shifted leftward through one decimal place by the total-taking mechanism, it will be found that at the completion of said step the column totalizer 98 with its comma place is in operative position and the product mechanism P—not having a comma position—with its gear representing the "5" of the tenths place of the product "4,5500" is in total-taking position, that is, opposite the rack D of the tens gear Z of the gear set 4.

Upon arrival of the comma place of the column totalizer 98 opposite the master wheel A, and as a result thereof, the comma rider 99 mounted on the bar 10 causes its catch 99a to trip a distance skipping mechanism (not shown) for operation and initiate an additional step of movement of the paper carriage 8 effected in response to another revolution of the drive shaft, which also results in simultaneously shifting the product mechanism one step. Consequently the gear of the product mechanism P representing the "5" of the hundredths order of the product "4,5500" is automatically brought into total-taking position, that is, opposite the rack D of the tens gear Z of the gear set 4, without the "5" of the tenths order of the product "4,5500" having previously been set on "0" by total-taking. Consequently, the tenths place after the comma of a product value would be skipped during total-taking. To avoid such faulty calculation the following device has been installed.

*Comma skipping during product total-taking*

The automatic engagement of the total-taking mechanism of the bookkeeping machine after the calculation of the product, is effected by a positive depression of the total-taking key lever 155 (Fig. 2) clockwise around its shaft 156. A bar 158 pivoted to the arm 157 of the key lever 155 is shifted rearwardly by the total taking key to cause a roller 159 of this bar 158 to wipe over a cam face 160 at the lower end of a vertical slide 161 mounted to slide along the rear wall of the machine frame on pin and slot connections and moves said slide 161 upwards against the spring 162. A supporting member 164 is mounted to slide on the upper part of the slide 161 by means of a screw 163 (Fig. 4) and acted upon by a pressure spring 167 attached at one end to the pin of the screw 163 and at the other end to a pin 166 riveted into said supporting member and protruding through a longitudinal guiding slot 165 of the slide 161. The supporting member 164 is also guided by a recess 168 of the supporting bridge 28.

The supporting member 164 participates in the upward movement of the slide 161 by means of the flexible connection 163, 167, 166 and thereby is moved into the path of a projection 169 of the slide 27 of the coupling system 18, 27, 46, which at this moment assumes the position shown in Fig. 17, the projection 169 being spaced from the left of the supporting member 164 by one step.

As soon as on product total-taking, the "4" of the product "4,5500" has been printed, the paper carriage shifts one step to the left and consequently the comma place of the column totalizer 98 is brought into operative position. The roller 94 of the member 96 (Figs. 4, 5 and 18) will also slide down the cam 93 of the rail 90 of the flap 69. Consequently the members 69, 71, 75 and 82 under action of spring 77 are returned to rest position in the direction of the arrow 79 and the edge 80 of the crank 75 strikes against the rear edge 28b of the supporting bridge 28. Simultaneously the lock-catch 86 of the locking lever 82 is again moved out of the pathway of the edge 87 of the stop 88 of the slide 27 so that now the coupling members 18, 27, 46 are moved towards right by means of the spring 37. After having traversed a distance corresponding to one step of the paper carriage, the movement of the coupling members 18, 27, 46 towards right is stopped by the right lateral face of the projection 169 of the slide 27 striking against the left lateral face of the supporting member 164 (Fig. 18). Simultaneously the registering wheel 6 is moved by one step towards left by means of the gears 104, 105, 106, 109, 110, 111, 118, so that thereafter the registering wheel is in mesh with the rack F of the rack system B corresponding with the hundreds gear $h$ of the gear set 4, as shown in Fig. 18.

It follows from the above that on skipping the comma place of the column totalizer 98 during the product total-taking, the paper carriage 8 and the product mechanism P of the multiplying mechanism are moved by two steps, but the registering wheel 6, however, is moved one step only, so that the latter now faces the hundreds gear $h$, of the gear set 4 and serves to drive said gear $h$, for the purpose of total-taking from the product mechanism.

As explained above, the "5" of the tenths denomination of the product "4,5500" after skipping the comma place, registers with the hundreds place $h$, of the gear system 4, so that for the present the tenth denomination of the product "4,5500" is set to zero by total-taking. Thereupon the printing of the "5" starts a further step of the paper carriage 8 as well as of the product mechanism P, so that thereafter the "5" of the hundredths denomination of the product "4,5500" is moved into total-taking pick-up position, i. e., in register with the hundreds place $h$, of the rack F of the rack system B co-ordinated with the gear system 4, and is reset.

Subsequently, the thousandths and ten thousandths denomination of the product "4,5500" are cleared by total-taking. Since, however, these denominations in the present product "4,5500" already contain "zeros," no clearing takes place by product total-taking. By means of a convenient cancelling mechanism, not shown or described, the values of the third and fourth orders to the right of the comma place are prevented from being printed. Neither can these values be included in the calculation of the product totalizer 98, since this column totalizer commands only two calculating orders to the right of the comma.

The product total-taking completed, the total-taking mechanism is also arrested automatically in a suitable manner since the key lever 155 (Fig. 2) is returned anti-clockwise into its normal position. Consequently the bar 158 is again moved towards the front, the roller 159 releasing the cam 16 of the slide 161. The slide 161 and its supporting member 164 are now moved downwards by the spring 162 whilst the member 164 is again placed out of reach of the projection 169 of the slide 27. Consequently the coupling system 18, 27, 46 is released and at this moment is snapped back into normal position in the direction of arrow 39 by means of the spring 37, the end 40 of the slide 27 striking against the rubber stop 41 (Fig. 4). The registering wheel 6 is also moved towards the left into normal position (Figs. 3 and 5) by means of the gears 104, 105, 106, 109, 110, 111, 118. Simultaneously the products register P and the multiplier register C are suitably moved towards the right to normal position, according to Fig. 10.

As soon as the entries upon the line of the sheet have been completed, the paper carriage 8 is again moved to its right hand position by depressing the carriage return key 170 (Fig. 1). During this movement of the paper carriage towards the right, the roller 94 (Fig. 4) of the supporting member 96 slides along the cam edge 93, 92 of the rail 90 of the flap 69, whereby the latter as well as the members 71, 75 and 82 are swung down in the opposite direction of the arrow 79 against the action of spring 77. Since, however, after a short while the catch lever 82 by means of its stop 86 strikes against the upper side of the stop 88 of slide 27 of the coupling system 18, 27, 46, the catch lever 82 does not participate any more in the further movement of the members 69, 71, 75, but only the spring 81 is tensioned.

During the subsequent movement towards the right of the paper carriage, the roller 94 again slides down the cam 91, whereby the members 90, 69, 71, 75, 82 are returned to normal position by the spring 77.

On further sliding movement of the paper carriage to the right, the coupling member 22 by means of its cam edge 22a (Fig. 7) also bears upon the slant 17a of the hook 17 of the pawl 18 the latter clockwise against the action of spring 57 which pawl after the passage of the coupling member 22, returns again into its normal position. The same process is repeated as soon as during the sliding movement of the carriage the coupling member 14 contacts with the catch 17 of the pawl 18. The locking pawl 46 is not affected thereby since in the normal position of the coupling system 18, 27, 46 it is kept outside of the path of movement of the coupling members 14 and 22 by the controls 49, 50.

Having now particularly described and ascertained the nature of my said invention and in what manner the same is to be performed, I declare that what I claim is:

1. In a typewriting-accounting machine having a set of numeral keys; a paper carriage shiftable in letter spacing direction under control of the numeral keys; a column totalizer mounted to travel with the paper carriage and having a punctuation space intervening between the whole number and fractional wheels thereof; and a differentially operable master wheel with which the whole number and fractional wheels of the totalizer are successively engageable as the paper carriage shifts in letter spacing direction; of a non-punctuated set of denominational gears; a differentially rotatable master wheel for said denominational gears, between which and the denominational gears there is relative axial travel; carriage-controlled means to shift the last-named master wheel axially relatively to the denominational gears simultaneously with the shifting of the totalizer wheels relatively to its master wheel to effect the simultaneous engagement of corresponding wheels and gears by their respective master wheels, including a lost-motion coupling between the paper carriage and the master wheel for said non-punctuated denominational gears; and means with which the lost motion coupling co-acts upon the passage of the punctuation space past the totalizer master wheel, to temporarily interrupt the carriage control of the master wheel for said non-punctuated denominational gears during such passage, thus compensating for the additional letter space travel of the punctuated totalizer relatively to the non-punctuated gears.

2. In a typewriting-accounting machine, having a paper carriage shiftable step by step in letter spacing direction, and returnable to starting position; the combination with a column totalizer, including a series of denominational wheels with a decimal space between the whole number wheels and the decimal wheels; differentially operable master actuator with which the successive denominational wheels of the totalizer engage under control of the carriage; a non-punctuated set of denominational gears corresponding with the denominational totalizer wheels; and a differentially operable transferring member between which and the set of gears there is relative axial movement, of means to connect the paper carriage with the transferring member to effect axial movement of said member to engage the transferring member with the denominational gears in consonance with the engagement of the master actuator with the totalizer wheels of corresponding denomination, including a slide, and a limited lost-motion coupling comprising a driving and a driven element positioned for engagement during carriage travel upon the entry of a column totalizer into the calculating zone; a latch capable of traveling with the driven element, and effective upon the driving element to assist in maintaining connection of the driving and driven elements; and a stationary device engageable by the latch, to retain the latch out of the path of the driving element until the driving element has advanced the driven element a predetermined distance, said stationary device effective to restore the latch to its ineffective position upon return of the driven element to its normal idle position.

3. In a typewriting-accounting machine having a paper carriage shiftable in letter spacing direction and return, the combination with a column totalizer, including a punctuated series of denominational wheels; a differentially operable master actuator engageable with successive denominational wheels of the totalizer, one after the other, under control of the carriage; and means to automatically effect a punctuation-skipping operation of the carriage; a non-punctuated set of denominational gears; an axially shiftable transferring member to differentially rotate the denominational gears of said non-punctuated set of denominational gears synchronously with the rotation of the corresponding denominational wheels of said totalizer by said master actuator; and carriage-controlled means to shift the transferring member axially, including a stop element associated in predetermined relation with the totalizer, a coupling mechanism connected with the transferring member to cause it to traverse the set of non-punctuated denominational gears, including a catch with which the stop co-acts to effect such traverse of the set of non-punctuated gears by the transferring member; means to disengage the catch, said disengaging means normally occupying an ineffective position; means to shift the normally ineffective disengaging means to its effective position for operation of the catch, first, as the decimal punctuation space of the punctuated set of totalizer wheels registers with its master actuator, and second, at the conclusion of the traverse of the second non-punctuated set of denominational gears by the transferring member, said stop having a reduced nose; means conveniently mounted on the disabling means, and having a predetermined relation to the punctuation space of the totalizer wheels, to shift the coupling catch from its initial contact with the active stop, to position to contact said reduced nose of the said stop coincidently with a punctuation-skipping operation of the carriage, and means to take up the lost motion between the coupling mechanism and the active stop occasioned by this temporary disconnection of the catch and the stop.

4. In a typewriting-accounting machine, the combination with a totalizer, including a punctuated series of denominational wheels; a differentially operable master actuator engageable with the punctuated denominational wheel successively under control of the carriage; and means to automatically effect a punctuation-skipping operation between the punctuated totalizer wheels and their master actuator; a non-punctuated set of denominational gears; and an axially shiftable transferring member to differentially rotate the non-punctuated denominational gears synchronously with the rotation of the corresponding denominational wheels of the totalizer by said master actuator; of means to shift the transferring member axially, including a pick-up element associated in predetermined relation with the totalizer, and provided with a reduced nose; a coupling mechanism connected with the transferring member to cause it to traverse the non-punctuated set of denominational gears step by step, including a catch engageable by an unreduced portion of the pick-up element; means engageable by the coupling mechanism in timed relation with the punctuation-skipping operation, to shift the catch to a position alined with the reduced nose of the pick-up element; and means to take up the lost motion occasioned by this positioning of the catch, to neutralize the effect of the punctuation-skipping operation on the axial travel of the transferring member.

5. In a tyepwriting-accounting machine, the combination with a totalizer, including a punctuated series of denominational wheels; a differentially operable master actuator engageable with the denominational wheels successively; means to effect a punctuation-skipping operation between the punctuated totalizer wheels and their master actuator; a set of non-punctuated denominational gears; and an axially shiftable transferring member to differentially rotate the non-punctuated denominational gears synchronously with the rotation of the corresponding denominational wheels of the totalizer by said master actuator; of means to shift the transferring member axially, including a tabulating stop associated in predetermined relation with the totalizer; a pick-up member on the stop having reduced and unreduced contact faces separated to an extent equal to one letter space; a coupling mechanism connected with the axially shiftable transferring member to cause it to traverse the set of non-punctuated denominational gears step by step, including a catch initially engaged by the unreduced contact face of the pick-up member; means engageable by the coupling mechanism in timed relation with the punctuation-skipping operation, to shift the catch to a position alined with the reduced end of the pick-up member; and means to take up the lost motion occasioned by this positioning of the catch, to neutralize the effect of the punctuation-skipping operation on the axial travel of the transferring member.

6. In a typewriting-accounting machine, the combination with a column totalizer, including a series of punctuated denominational wheels; a differentially operable master actuator engageable with the punctuated denominational wheels successively; a set of non-punctuated denominational gears; and an axially shiftable transferring member to differentially rotate the non-punctuated denominational gears synchronously with the rotation of the corresponding punctuated denominational wheels of the totalizer by said master actuator; of means to shift the transferring member axially, including a pick-up element associated in predetermined relation, and traveling, with the totalizer; a coupling mechanism including a slide connected with the transferring member to cause it to traverse the set of non-punctuated gears step by step, a catch suitably pivoted intermediate its ends on the coupling mechanism, the leading arm of the catch normally lying in the path of the pick-up element for engagement thereby; a camming surface on the trailing arm of the catch, a locking member pivoted intermediate its ends to the trailing arm of the catch; a spring interposed between the catch and the locking member to rock the leading end of the locking member into the path of travel of the pick-up element to co-act with the catch in connecting the coupling mechanism to the pick-up element; a second spring connected to the trailing end of the locking member and to the slide and effective through the pivot connection between the locking member and the catch to rock the catch to effective position; and a trip member engageable by the cam surface of the catch during carriage travel in letter spacing direction, to rock the leading arm of the catch relatively to the pick-up element.

7. In a typewriting-accounting machine, the combination with a totalizer, including a punctuated series of denominational wheels; a differentially operable master actuator engageable with the punctuated denominational wheels successively; means to effect a punctuation-skipping operation between the master actuator and its punctuated and denominational wheels; a non-punctuated set of denominational gears; and an axially shiftable transferring member to differentially rotate the non-punctuated denominational gears synchronously with the rotation of the corresponding punctuated denominational wheels of the totalizer by said master actuator; of means to shift the transferring member axially, including a pick-up element associated in predetermined relation with the totalizer and provided with a stepped nose; a coupling mechanism connected with the transferring member to cause it to traverse the set of non-punctuated denominational gears step by step, including a shiftably supported catch normally engageable by one contact face of the pick-up element, said catch having a cam surface; and a releasing member, including a pair of spaced-apart contact devices arranged in staggered relation, in the path of the cam surface on the catch, engagement of which cam surface with the rearmost of the two staggered contact devices during travel of the catch in letter spacing direction results in shifting the catch to a position in line with the stepped nose of its pick-up element, in timed relation with the punctuation-skipping operation to neutralize the effect of the punctuation-skipping operation on the transferring member, subsequent engagement of the cam surface of the catch with the foremost of said staggered contact devices during continued travel in letter spacing direction operating to disengage the catch from the pick-up element.

8. In a typewriter-accounting machine, the combination with a totalizer, including a punctuated series of denominational wheels; a differentially operable master actuator engageable with the punctuated denominational totalizer wheels successively; means to effect a punctuation-skipping operation between the punctuated totalizer wheels and their master actuator; a non-punctuated set of denominational gears; and an axially shiftable transferring member; of means to shift the transferring member axially to engage the non-punctuated denominational gears successively and synchronously with the engagement of the master actuator with the corresponding punctuated denominational totalizer wheels, including a pick-up element having a predetermined relation with the totalizer; a coupling mechanism connected with the transferring member, including a slide, there being relative movement between the totalizer and its pick-up element, and the coupling mechanism; a catch shiftably mounted on the slide, and normally engageable with the pick-up element; a shiftable catch-releasing member normally in idle position; means travelling with the pick-up element to shift the catch-releasing member to, and retain it in its effective position; a spring to restore the slide and its connections towards initial position upon the release of the catch from its pick-up element; a normally idle arresting arm shiftable to effective position under control of the means which shifts the catch releasing member, to arrest the slide and its connections short of a complete return to initial position upon the occurrence of a punctuation-skipping operation; means to restore the arresting arm to its normal idle position; means to maintain the slide and its connections in arrested position notwithstanding the return of the arresting arm to idle position, including a stop on the slide; and a key-controlled stop to co-act with the stop on the slide subsequently to a punctuation-skipping operation whereby to neutralize the effect of the punctuation-skipping operation on the axial travel of the transferring member for the non-punctuated set of denominational gears, subsequently to the release of said arresting arm.

9. In a typewriting-accounting machine having a paper carriage shiftable in letter spacing direction and return; the combination with a totalizer mounted to travel with the carriage, and including a series of punctuated denominational wheels; a differentially operable master actuator with which the denominational totalizer wheels successively engage under control of the carriage; means to effect a punctuation-skipping operation of the carriage and punctuated totalizer relatively to the master wheel; a non-punctuated set of denominational gears; and an axially shiftable, differentially rotatable transferring member; of means to effect the engagement of said transferring member with the non-punctuated denominational gears successively, in synchronism with the engagement of the master actuator with the corresponding denominational wheels of the punctuated set, including a carriage-controlled pick-up element in predetermined relation to and travelling with the totalizer; a coupling mechanism connected with the transferring member, including a slide; a catch shiftably mounted on the slide and normally engageable by the pick-up element; means to disengage the catch and the pick-up element; a spring to restore the slide and its connections towards initial position; a normally idle arresting arm shiftable to position to arrest the slide and its connections short of a complete return; means operable by the carriage to shift the arresting arm to, and retain it in its effective position prior to the disengagement of the catch and its pick-up element; means to restore the arresting arm to idle position; means to prevent complete return of the slide notwithstanding the return of the arresting arm to its idle position, including a stop on the slide; and a key-set stop relatively to which the stop on the slide is arrested when one punctuation space distant therefrom, as the slide is returned towards its initial position, which space is compensated upon the release of the arresting arm by said carriage-controlled shifting means.

10. In a typewriting-accounting machine having a carriage shiftable in letter spacing direction and return; the combination with a punctuated set of denominational totalizer wheels; a differentially operable master actuator therefor, engageable with successive totalizer wheels under carriage control; means to initiate a punctuation-skipping operation of the carriage and punctuated totalizer relatively to the master actuator; a set of non-punctuated denominational gears; and a differentially operable transfer member axially movable relatively to the non-punctuated set of denominational gears; of carriage-controlled means to axially shift the transfer member to engage successive denominational non-punctuated gears for rotation synchronously with the engagement of the master actuator with successive punctuated totalizer wheels of corresponding denomination for rotation thereof, including a pick-up element travelling with the carriage; a coupling mechanism connected with the transferring member, including a catch engageable by the pick-up element; means engageable by the coupling mechanism to provide lost motion between the catch and the pick-up element, in timed relation with the occurrence of the punctuation-skipping operation of the carriage; and means to take up the lost-motion thus provided to neutralize or compensate for the effect of said punctuation-skipping operation on the transferring member for the non-punctuated set of denominational gears.

11. In a typewriting-accounting machine having a set of numeral keys; a paper carriage shiftable in letter spacing direction under control of the numeral keys; a master wheel differentially rotatable under control of the numeral keys; a totalizer including a series of punctuated wheels, mounted to travel with the paper carriage relatively to the master wheel; a set of non-punctuated denominational gears relatively to which the carriage travels; an auxiliary master wheel axially shiftable relatively to the gears; and means to effect a punctuation-skipping of the carriage and punctuated totalizer wheels relatively to its master wheel; of a lost-motion connection between the carriage and the auxiliary master wheel to simultaneously engage the respective master wheels with their respective wheels and gears of corresponding denomination, including releasable engaging coupling members, one of which travels with the carriage and is provided with stepped engaging faces separated by the distance of one punctuation space, and the other of which coupling members is connected with the auxiliary master wheel; a trip member fixed as to its location relatively to the letter-spacing travel of the carriage, with which trip member said last-named coupling member collides during carriage travel, at an intermediate point in the axial travel of the auxiliary master wheel past the non-punctuated set of gears, said intermediate point corresponding approximately with the punctuation space in the punctuated set of wheels, to disengage the last-named coupling member from one step face of its co-acting coupling member, and means effective upon said last-named coupling member to cause it to recede a distance equivalent to the punctuation space and engage the next step face of the first-named coupling member to nullify the effect of the punctuation-skipping movement with respect to the auxiliary master wheel.

ROBERT ANSCHÜTZ.